No. 817,598. PATENTED APR. 10, 1906.
H. STOLPE.
TWINE HOLDER AND CUTTER.
APPLICATION FILED MAY 25, 1905.
3 SHEETS—SHEET 2.
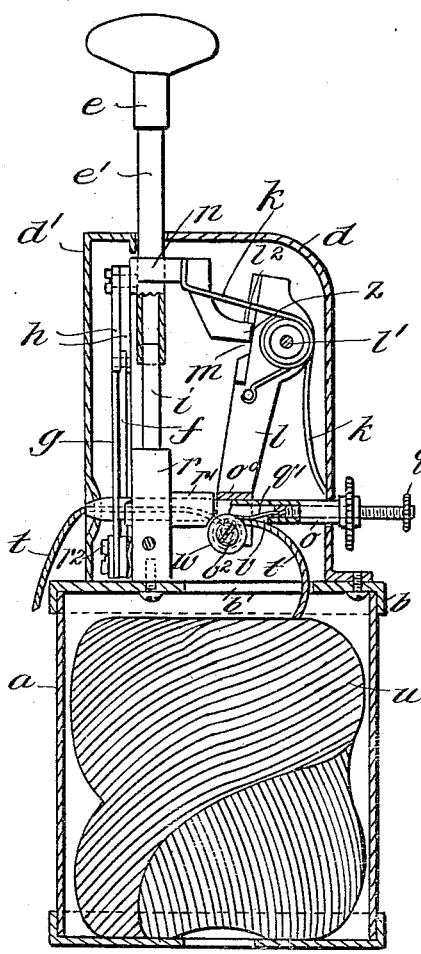
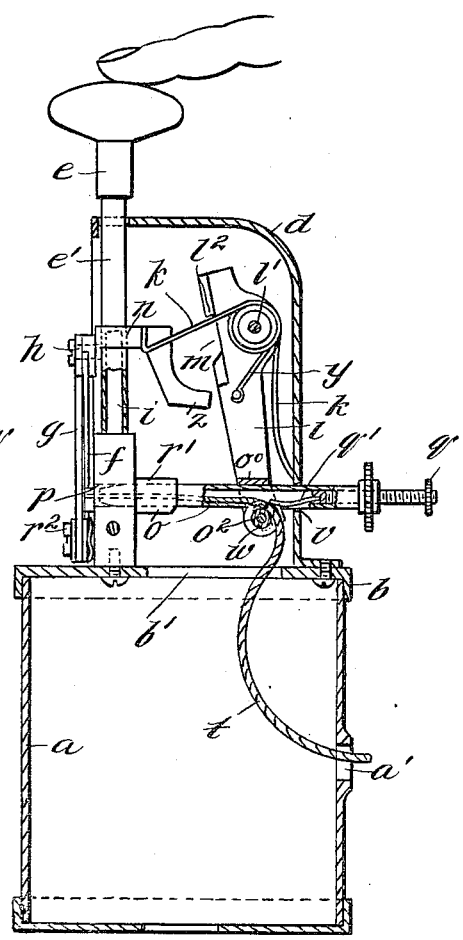
Witnesses:
C. D. Kesler
J. Fred. Kelley
Inventor
Hugo Stolpe
By James L. Norris
Atty.

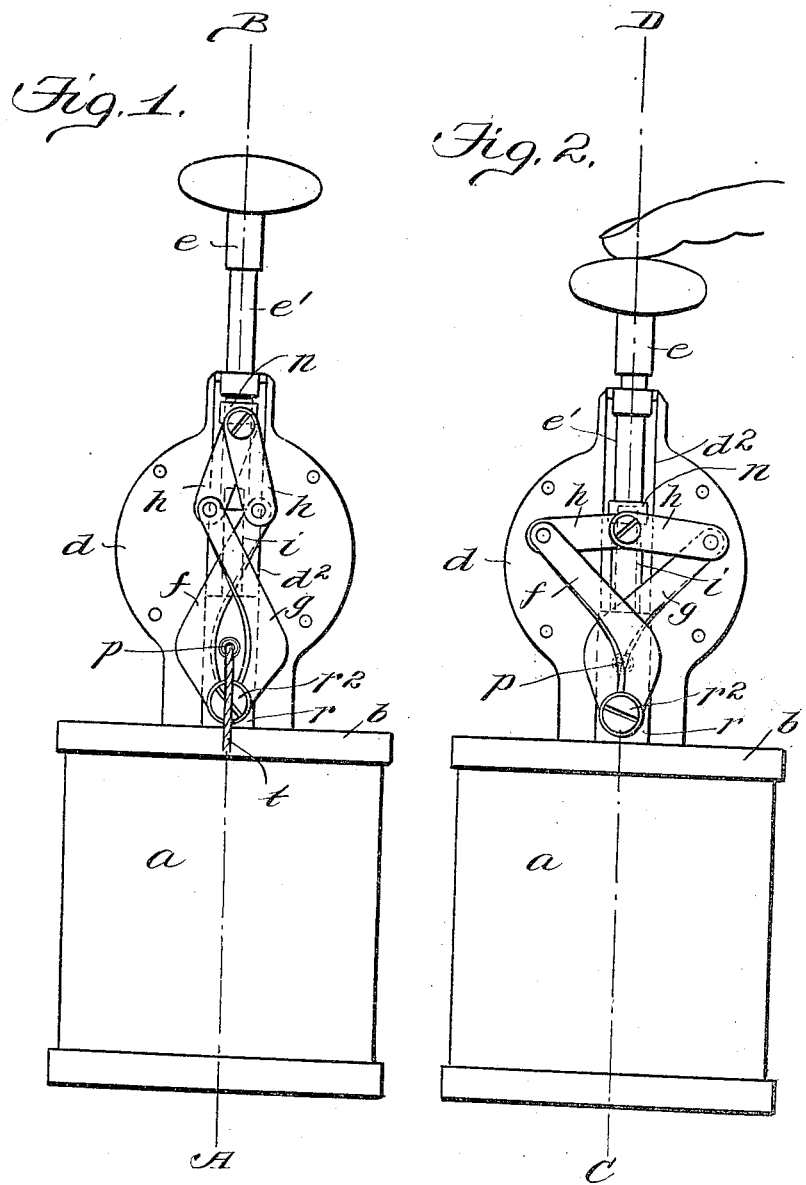

No. 817,598. PATENTED APR. 10, 1906.
H. STOLPE.
TWINE HOLDER AND CUTTER.
APPLICATION FILED MAY 25, 1905.
3 SHEETS—SHEET 3.
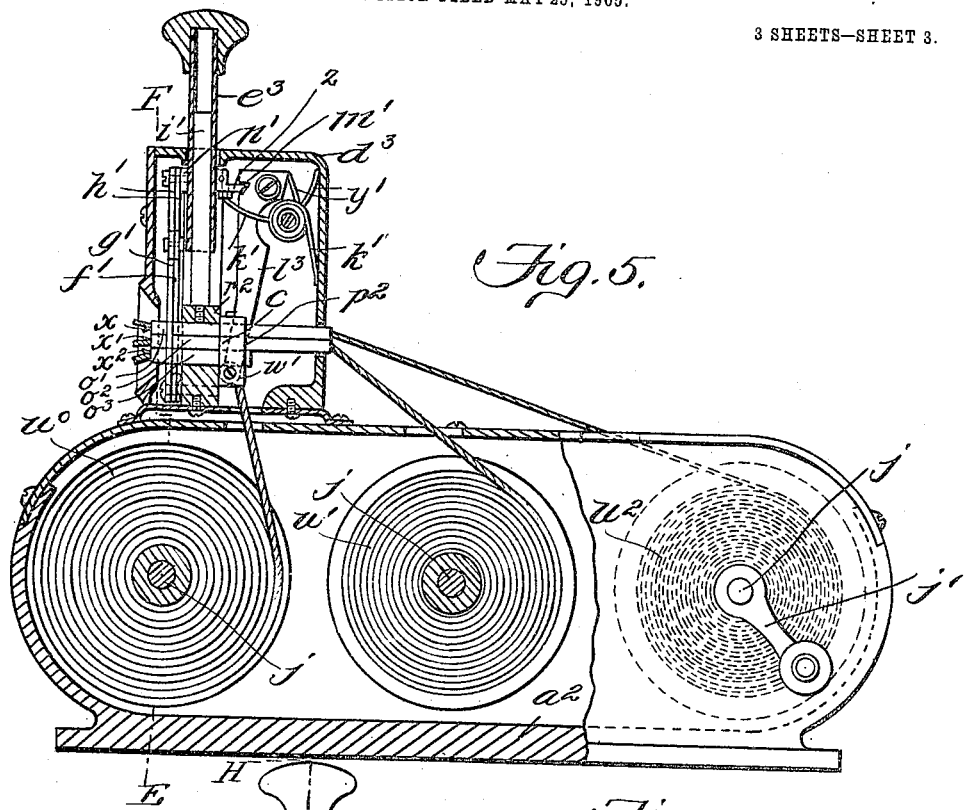
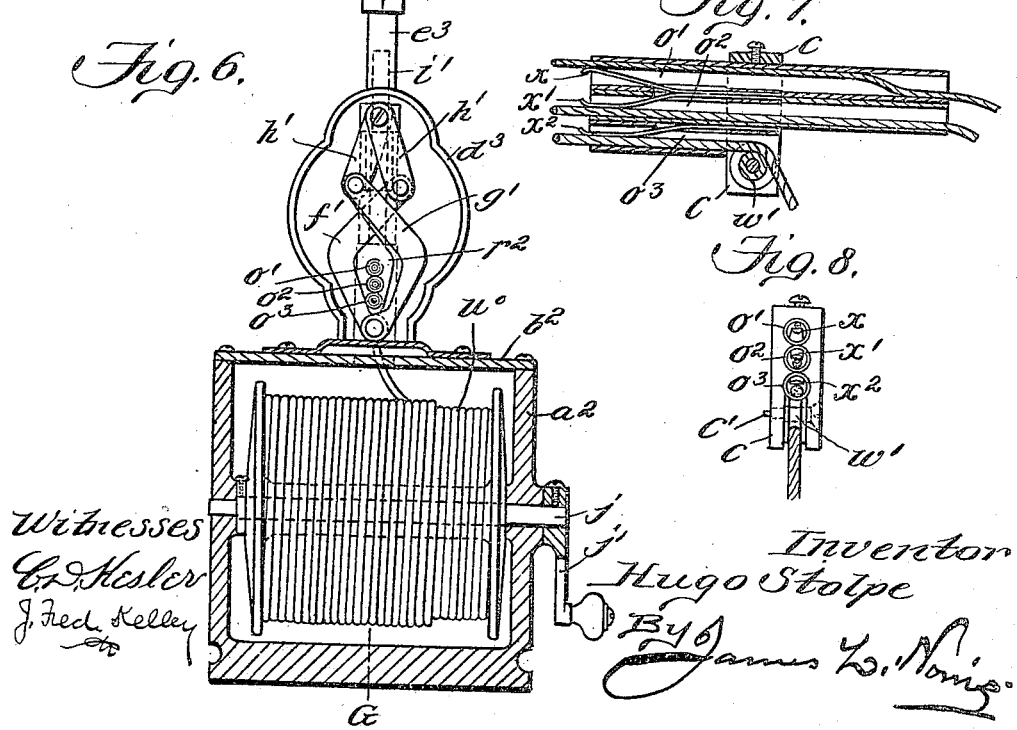
Witnesses
C. D. Kesler
J. Fred. Kelley
Inventor
Hugo Stolpe
By James L. Norris
Atty

UNITED STATES PATENT OFFICE.

HUGO STOLPE, OF PANKOW, GERMANY.

TWINE HOLDER AND CUTTER.

No. 817,598. Specification of Letters Patent. Patented April 10, 1906.

Application filed May 25, 1905. Serial No. 262,185.

*To all whom it may concern:*

Be it known that I, HUGO STOLPE, a citizen of the Empire of Germany, residing at 18 Mühlenstrasse, Pankow, near Berlin, in the Empire of Germany, have invented a new and useful Twine Holder and Cutter, of which the following is a specification.

My invention relates to improvements in twine holders and cutters of that kind in which the cutting device is disposed on the cover of the twine-holder; and the objects of my improvement are, first, to provide one or several superposed horizontal twine-guides movable longitudinally in the cutting device; second, to arrange a vertically-disposed pair of scissors within the casing of the cutting device to be actuated by a spring-pressed depressor by means of toggle-levers; third, to provide a spring-pressed lever controlled by the depressor for normally holding the one or several superposed twine-guides between the opened pair of scissors, so that the ends of the twine or twines project without and may be seized with one's fingers for drawing out a convenient length of twine and for withdrawing the twine guide or guides from the pair of scissors during the first part of the downward stroke of the depressor; fourth, to provide one or several springs within the one or several superposed twine-guides for braking the twine or twines; fifth, to provide the twine-holder below with means for winding on the twine or twines drawn out where so preferred, and, sixth, to provide the twine-holder with one or several holes through which the twine or twines from one or several balls or the like without may be conducted. I attain these objects by the arrangements illustrated in the accompanying drawings, in which—

Figure 1 is an elevation of a single twine holder and cutter, the front cover of the cutting device being removed to show the pair of scissors in its normal open state. Fig. 2 is a similar elevation to show the pair of scissors as closed by the depressed depressor. Fig. 3 is a vertical longitudinal section through the line A B in Fig. 1, all the parts occupying their normal positions and a ball of twine being placed in the holder. Fig. 4 is a similar vertical longitudinal section, all the parts occupying their other extreme positions while the depressor is depressed and a twine being introduced from without through the holder. Fig. 5 is a vertical longitudinal section through a treble twine holder and cutter on the line G H in Fig. 6, the right part of the holder being shown in the elevation. Fig. 6 is a section through the broken line E F in Fig. 5. Fig. 7 is a vertical longitudinal section, on an enlarged scale, through the treble twine-guide; and Fig. 8 is a front view of the same.

Similar characters of reference refer to similar parts throughout the several views.

The single-twine holder and cutter shown at Figs. 1 to 4 comprises a box or holder $a$, with a loose cover $b$, a casing $d$ for the cutting device, and a front cover $d'$. The casing $d$ is secured on the cover $b$ and has a front slot $d^2$, in which a block $r$ is disposed and secured on the cover $b$. The block $r$, provided with a projection $r'$, is horizontally bored, the same as the casing $d$, for guiding the twine-guide $o$. The latter is made hollow and provided with a clamp $o^0$ and an opening $v$. In the side parts of the clamp $o^0$ a bolt $o^2$ is secured, on which a twine-guiding roller $w$ is mounted to turn. A lever $l$, turning on a pin $l'$, is slotted at its free end for engaging the one end of the pin $o^2$ and is normally pressed to the rear (in Figs. 3 and 4 from left to right) by a spring $y$. Near its axis the lever $l$ is provided with a recess $m$, the purpose of which will be explained hereinafter. Within the cavity of the twine-guide $o$ a leaf-spring $v$, connected with an adjusting-screw $q$, is disposed for braking the twine $t$. (See Fig. 3.) On the block $r$ a pin $r^2$ is secured, on which the two members $f$ and $g$ of the scissors are mounted to turn. The upper ends of these two members $f$ and $g$ are pivotally connected, by means of two toggle-levers $h$ $h$, with a cross-head $n$ on the vertical rod $e'$ of the depressor $e$. The block $r$ is made in one piece with a vertical rod $i$, which latter serves for guiding the lower hollow part of the depressor-rod $e'$. The depressor $e$ is normally pressed upward by a spring $k$, which is connected with its cross-head $n$ and is wound loosely around the nave of the lever $l$ and bears with its free end against the rear wall of the casing $d$. The cross-head $n$ is provided with an arm $z$, which normally engages in the recess $m$ of the lever $l$ and bears against the upper face $l^2$. The spring $k$ is made strong enough to overcome the tension of the other spring $y$ and to force the lever $l$, with the twine-guide $o$, forward, (in Figs 3 and 4 from right to left.) The pair of scissors $f$ $g$ is inclosed by a front cover $d'$, and the latter is provided with a hole through which the front end $p$ of the twine-guide $o$ normally just projects. Then the free end of the twine $t$ will hang down from the guide $o$ and can be seized with one's fingers. The box or holder $a$ may be provided with a convenient hole $a'$.

The apparatus is operated as follows: The cover $b$, with the cutting device thereon, is taken off, and a ball $u$, of twine, is placed in the holder $a$. Then the free end of the twine $t$ is introduced from below through the hole $b'$ in the cover $b$ and between the guiding-roller $w$ and the braking leaf-spring $q'$ through the guide $o$ to without, after which the cover $b$, with the cutting device, is put over the holder $a$. As will be evident from Fig. 3, the guide $o$ projects between the two members $f$ and $g$ of the scissors to without, so that the free end of twine may be seized for drawing out a convenient length of the twine, after which the depressor $e$ is depressed, Fig. 2. During the first part of the downward stroke of the depressor $e$ the lever $l$ under the action of its spring $y$ follows this motion of the depressor $e$ until the arm $z$ releases the upper face $l^2$ of the recess $m$, when the lever $l$ will recoil to the rear and withdraw the front end $p$ of the twine-guide $o$ from the pair of scissors. (See Fig. 4.) The several parts are so proportioned that the two members $f$ and $g$ can cut the twine $t$ only after the front end of the guide $o$ has been completely withdrawn and the twine $t$ is at rest. On being released the depressor $e$ will instantly rebound and return all the parts to their initial positions, the arm $z$ striking against the upper face $l^2$ of the recess $m$ and taking along with it the lever $l$.

Where it is so preferred, or in case the ball $u$ is too big for the holder $a$, the ball may be placed without and its free end $t$ introduced first through the hole $a'$, Fig. 4, of the holder $a$ and then through the guide $o$ in the manner described above. The braking leaf-spring $q'$ is very convenient for holding the twine $t$ in any position and for preventing it from shifting or disappearing.

The twine holder and cutter requires but slight modifications in case the holder is to receive several balls of twines of different thicknesses, so as to be able to select any thickness of the twine and to cut it with the same pair of scissors without interfering with the other twines. A so-modified twine holder and cutter for three twines of different thicknesses is shown at Figs. 5 to 8. The holder $a^2$ of a convenient length is shown as provided with three parallel horizontal turnable shafts $j$, with twine-spools and hand-cranks $j'$ fastened thereon. The three spools are to receive twines $u^0$, $u'$, and $u^2$ of different thicknesses. The cover $b^2$, provided with three holes for the three twines, is shown as secured on the holder $a^2$ by means of screws; but it may be also arranged to be at once removable in a similar manner as the cover $b$ in Figs. 1 to 4. The cutting device is placed above the front twine spool $u^0$. It is substantially the same as described above, only that instead of the single twine-guide $o$ three superposed twine-guides $o'$ $o^3$ $o^4$ are employed, which are secured in a common clamp $c$, in the lower end of which a guiding-roller $w'$ for the lowermost twine is disposed. For braking the three twines three leaf-springs $x$ $x'$ $x^2$ are employed, which for the sake of simplicity are secured between the three guides $o'$ $o^3$ $o^4$ in suitable recesses and engage through suitable holes into the respective guide-cavities for pressing the twines on the internal walls, as is clearly shown at Fig. 7. The lowermost guide $o^4$ is made short, and the two upper guides $o'$ and $o^3$ are made longer, so as to be guided not only in the block $p^3$, but also in the rear wall of the casing $d^3$. Then the two twines $u'$ and $u^2$ will pass right through the cutting device. The lever $l^3$ is shown as modified in shape; but this is immaterial. It is slotted at the lower end for engaging the projecting end $c'$, Fig. 8, of the pin of the roller $w'$ and is pressed rearwardly by its spring $y'$. The manner of operating this apparatus is obvious and as follows: Either twine is selected, and its end projecting from the guides $o'$ $o^2$ $o^3$ is seized with one's fingers for drawing out a convenient length, and afterward the depressor $e^3$ is depressed for cutting the twine by means of the parts $h'$ $h'$ $f''$ $g'$. The two twines not selected are withdrawn with their guides by means of their braking-springs during the downward stroke of the depressor $e^3$, so that they are not cut by the pair of scissors $f''$ $g'$, after which they are returned to their initial position. In case too great a length of the twine should have been drawn out a part of it may be returned by winding it on the respective spool with the aid of the hand-crank $j'$. The braking leaf-springs $x$ $x'$ $x^2$ are also very convenient for winding the several twines under proper tension on their spools.

The twine holder and cutter may be varied in many respects without deviating from the spirit of my invention.

What I claim as my invention, and desire to secure by Letters Patent, is—

1. The combination with a casing, of a pair of scissors therein, a twine-guide longitudinally guided in said casing, a depressor having movement parallel to the plane of said pair of scissors, and means controlled by said depressor for normally opening said pair of scissors and projecting the one end of said twine-guide between them without, so that the twine may be seized and drawn out and on depressing said depressor said twine-guide is first withdrawn from the scissors and afterward the twine is cut.

2. The combination with a casing, of a pair of scissors therein, a depressor guided in said casing parallel to the plane of said pair of scissors, a pair of toggle-levers pivotally connecting said pair of scissors with said depressor, a twine-guide longitudinally guided in said casing in a line at right angles to the plane of said pair of scissors, a pin in said casing, a lever mounted on said pin to turn and pivotally connected with said twine-guide and provided with a recess, a spring acting upon said lever for withdrawing said twine-guide from said pair of scissors, a mainspring tending to return said depressor into its normal position and adapted to overcome said spring, and an arm on said depressor and adapted to engage in the recess of said lever for projecting the one end of said twine-guide to without between said pair of scissors in its opened state and to withdraw from the recess during the first part of the stroke of said depressor when depressed.

3. The combination with a twine-holder, of a casing removably placed thereon, a pair of scissors in said casing, a twine-guide longitudinally guided in said casing, a depressor having movement parallel to the plane of said pair of scissors, and means controlled by said depressor for normally opening said pair of scissors and projecting the one end of said twine-guide between them to without, so that the twine may be seized and drawn out and on depressing said depressor said twine-guide is first withdrawn from the scissors and afterward the twine is cut.

4. In a twine holder and cutter, the combination with a tube-like twine-guide longitudinally guided on both ends in the casing and having about in its middle a hole and a bracket, of a pin in the bracket on said tube-like twine-guide, a twine-guiding roller, mounted to turn on said pin and adapted to introduce the twine into said tube-like twine-guide through its hole, and elastic means in said tube-like twine-guide for braking the twine.

5. In a twine holder and cutter, the combination with a casing, of a pair of scissors placed vertically therein, a depressor vertically guided in said casing, a pair of toggle-levers pivotally connecting said pair of scissors with said depressor, a twine-guide horizontally guided in said casing, a pin in said casing, a lever mounted on said pin to turn and pivotally connected with said twine-guide and provided with a recess, a spring acting upon said lever for withdrawing said twine-guide from said pair of scissors, a mainspring tending to return said depressor into its normal position and adapted to overcome said spring, and an arm on said depressor and adapted to engage in the recess of said lever for projecting the one end of said twine-guide to without between said pair of scissors in its opened state and to withdraw from the recess during the first part of the downward stroke of said depressor.

6. In a twine holder and cutter, the combination with a twine-holder, of a cutting device, a casing removably placed thereon and comprising the cutting device and a longitudinally-movable twine-guide, which normally projects with the one end to without, so that the twine may be seized and drawn out, while for the cutting operation the twine-guide is withdrawn for permitting the cutting device to operate, and a depressor guided in said casing.

7. In a twine holder and cutter, the combination with a tube-like twine-guide longitudinally guided on both ends in the casing and having about in its middle a hole and a bracket, of a twine-guiding roller mounted to turn on said pin and adapted to introduce the twine into said tube-like twine-guide through its hole, a leaf-spring within said tube-like twine-guide for braking the twine, and means for adjusting said leaf-spring.

8. In a twine holder and cutter, the combination with a twine-holder, of a casing removably placed thereon and comprising the cutting device and a longitudinally-movable twine-guide, which normally projects with the one end to without, so that the twine may be seized and drawn out, while for the cutting operation the twine-guide is withdrawn for permitting the cutting device to operate, said twine-holder having a lateral hole, through which a twine from without may be introduced upward to the cutting device.

9. In a twine holder and cutter, the combination with a box adapted to hold a plurality of twine balls or spools, of a detachable cover, a casing on said detachable cover, a pair of scissors in said casing, a plurality of superposed twine-guides longitudinally guided in said casing, elastic means in said plurality of superposed twine-guides for braking the twines coming from said box below, a depressor, and means controlled by said depressor for normally opening said pair of scissors and projecting between them said plurality of superposed twine-guides to without so that either twine may be selected and drawn out and on depressing said depressor said plurality of superposed twine-guides is first withdrawn from the scissors and afterward the selected twine is cut.

In testimony whereof I have signed my name to this specification in the presence of two subscribing witnesses.

HUGO STOLPE.

Witnesses:
SIEGFRIED HERZBERG,
MAUSER TRIPLET.